(12) United States Patent
Kalyani et al.

(10) Patent No.: US 11,433,493 B2
(45) Date of Patent: Sep. 6, 2022

(54) FLUID END AND METHOD OF MANUFACTURING IT

(71) Applicants: Bharat Forge Limited, Mundhwa Pune Maharashtra (IN); Babasaheb Neelkanth Kalyani, Mundhwa Pune Maharashtra (IN); Madan Umakant Takale, Mundhwa Pune Maharashtra (IN); Vijaykumar Hanumantrao Khasnis, Mundhwa Pune Maharashtra (IN); Amol Raghunathrao Deshmukh, Mundhwa Pune Maharashtra (IN)

(72) Inventors: Babasaheb Neelkanth Kalyani, Mundhwa Pune Maharashtra (IN); Madan Umakant Takale, Mundhwa Pune Maharashtra (IN); Vijaykumar Hanumantrao Khasnis, Mundhwa Pune Maharashtra (IN); Amol Raghunathrao Deshmukh, Mundhwa Pune Maharashtra (IN)

(73) Assignee: Bharat Forge Limited, Maharashtra (IN)

( * ) Notice: Subject to any disclaimer, the term of this patent is extended or adjusted under 35 U.S.C. 154(b) by 364 days.

(21) Appl. No.: 15/779,786

(22) PCT Filed: Dec. 1, 2016

(86) PCT No.: PCT/IB2016/057237
§ 371 (c)(1),
(2) Date: May 29, 2018

(87) PCT Pub. No.: WO2017/093918
PCT Pub. Date: Jun. 8, 2017

(65) Prior Publication Data
US 2018/0354081 A1    Dec. 13, 2018

(30) Foreign Application Priority Data
Dec. 1, 2015 (IN) ............... 4509/MUM/2015

(51) Int. Cl.
*B21K 1/26* (2006.01)
*B23P 15/50* (2006.01)
(Continued)

(52) U.S. Cl.
CPC ........... *B23P 15/50* (2013.01); *B21J 5/025* (2013.01); *B21K 1/26* (2013.01); *B23P 15/00* (2013.01);
(Continued)

(58) Field of Classification Search
CPC ....... B21J 1/06; B21J 5/02; B21J 5/022; B21J 5/025; B21J 1/04; B21J 13/02;
(Continued)

(56) References Cited

U.S. PATENT DOCUMENTS 3,650,143 A * 3/1972 Ruget ............... B21K 1/08
72/412
4,305,273 A   12/1981 Martin
(Continued)

FOREIGN PATENT DOCUMENTS

WO    2013050935 A1    4/2013

OTHER PUBLICATIONS

International Search Report for PCT/IB2016/057237 dated Mar. 22, 2017.
Written Opinion for PCT/IB2016/057237 dated Mar. 22, 2017.

*Primary Examiner* — Edward T Tolan
(74) *Attorney, Agent, or Firm* — Andrus Intellectual Property Law, LLP

(57) ABSTRACT

The present invention discloses a Fluid End and its manufacturing method. The conventional fluid end manufacturing
(Continued)

methods involve machining of all surfaces. This demands more input stock for manufacturing process and a lot of material wastage during machining process. In the conventional processes involving open die forging followed by machining result into only about 34% utilization of material. In the present invention, fluid end component geometry is optimized. Assembly surfaces are machined whereas other or non-assembly surfaces are as-forged condition. The method of invention also results in significant reduction in machining time and chip removal. The present invention also discloses a process of manufacturing using a combination of open die and closed die forging, and machining. It involves the steps of cogging an ingot to form billet for closed die forging using open die forging, forging the billet in closed die using forging equipment, semi-finish/rough/partial machining, heat treatment, drilling and finish machining the component. Most of the non-assembly areas of the fluid end are left in as-forged condition.

6 Claims, 12 Drawing Sheets

(51) Int. Cl.
| | | |
|---|---|---|
| *C21D 9/00* | (2006.01) | |
| *F04B 53/00* | (2006.01) | |
| *F04B 53/16* | (2006.01) | |
| *F16L 41/02* | (2006.01) | |
| *F04B 1/053* | (2020.01) | |
| *F04B 27/053* | (2006.01) | |
| *F04B 39/12* | (2006.01) | |
| *B23P 15/00* | (2006.01) | |
| *C21D 7/13* | (2006.01) | |
| *B21J 5/02* | (2006.01) | |

(52) U.S. Cl.
CPC .............. *C21D 7/13* (2013.01); *C21D 9/0081* (2013.01); *F04B 1/053* (2013.01); *F04B 27/053* (2013.01); *F04B 39/121* (2013.01); *F04B 39/123* (2013.01); *F04B 39/125* (2013.01); *F04B 53/007* (2013.01); *F04B 53/16* (2013.01); *F16L 41/021* (2013.01); *C21D 2221/00* (2013.01); *C21D 2261/00* (2013.01)

(58) Field of Classification Search
CPC .... F04B 39/121; F04B 39/123; F04B 39/125; B21K 1/14; B21K 1/26; B23P 15/50
See application file for complete search history.

(56) References Cited

U.S. PATENT DOCUMENTS

| | | | |
|---|---|---|---|
| 7,341,435 B2* | 3/2008 | Vicars | F04B 53/007 137/512 |
| 2009/0148091 A1* | 6/2009 | Kametaka | F16C 19/186 384/544 |
| 2013/0195701 A1* | 8/2013 | Skurdalsvold | F04B 53/16 417/521 |
| 2013/0312694 A1* | 11/2013 | Sakaguchi | F01L 3/00 123/188.3 |
| 2014/0238099 A1* | 8/2014 | Kalyani | B21J 5/025 72/341 |
| 2014/0260954 A1 | 9/2014 | Young | |
| 2015/0013423 A1* | 1/2015 | Wilson | B21J 7/34 72/352 |
| 2015/0260177 A1* | 9/2015 | Deel | F04B 37/12 251/333 |

* cited by examiner

Figure 3: View from Left side of product seen in Figure 2
(Prior Art)

(View from Top side of the product shown in Figure 1)
(Prior Art)

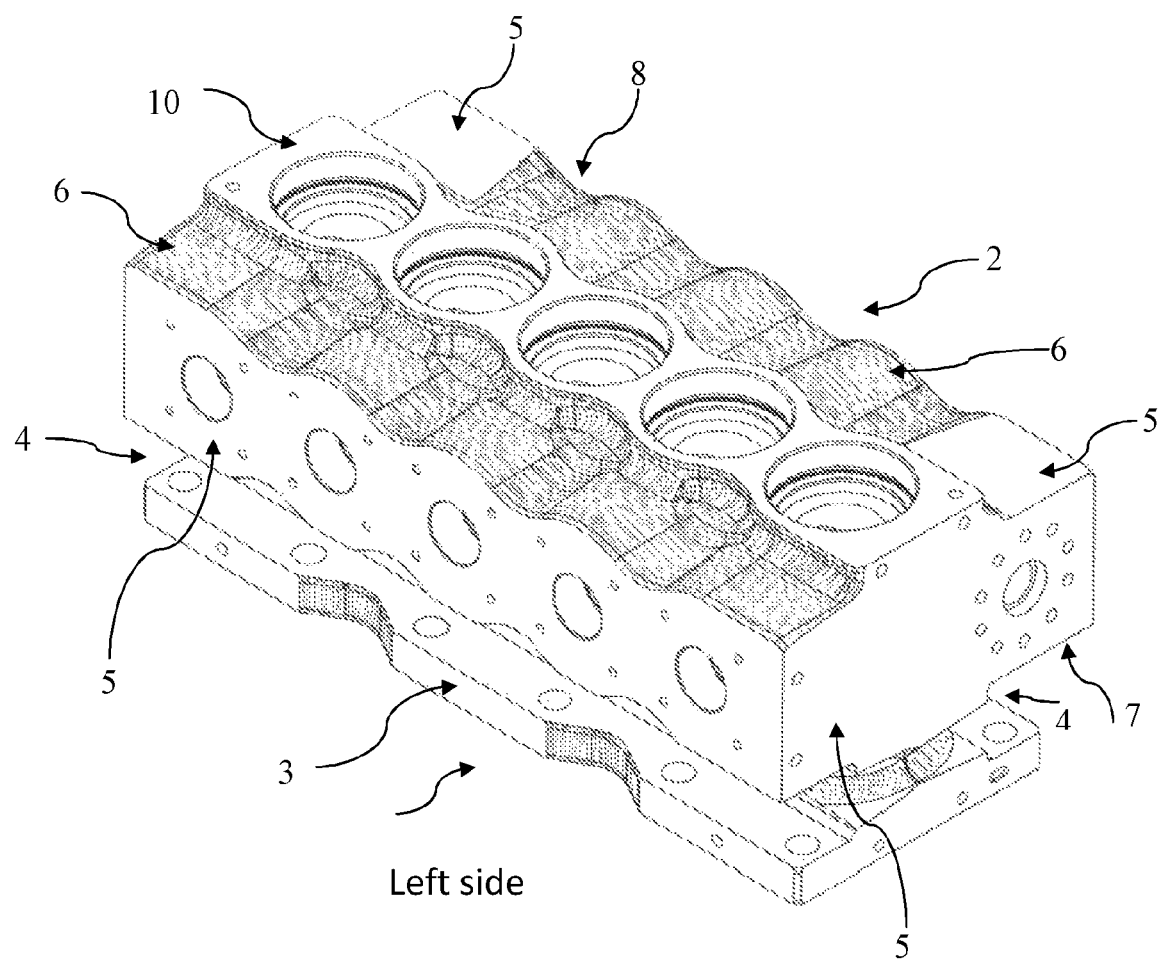
Figure 6

Figure 7: View from Left side of product seen in Figure 6

Figure 8: View from Top side of product seen in Figure 5

FLUID END AND METHOD OF MANUFACTURING IT

CROSS-REFERENCE TO RELATED APPLICATIONS

The present application is the U.S. national stage of International Application PCT/IB2016/057237, filed on Dec. 1, 2016, which international application was published on Jun. 8, 2017 as International Publication No. WO 2017/093918, which application claims priority to Indian National Application No. 4509/MUM/2015, filed on filed on Dec. 1, 2015, the contents of which applications are incorporated herein by reference in their entireties.

FIELD OF INVENTION

The invention generally relates to a component which is used in oil and gas field in the pumping operation and manufacturing of same. In particular, the present invention relates to the geometry (shape and size) optimization of a component such as a fluid end and optimization of its manufacturing process which results into improved productivity and strength by combination of forging and machining techniques.

BACKGROUND OF INVENTION

In oil and gas industry, offshore and onshore drillings are identified as focus areas. With new discoveries through shale gas and new technology in directional drilling, there is steep increase in demand for drilling equipment, particularly in the safety and application critical equipment. To meet this growth in demand of safety and application critical components, productivity improvement and innovation in manufacturing process is essential.

Many industries including oil and gas industries use safety and application critical components. For many decades many of these components have been manufactured using conventional manufacturing process (i.e., open die forging followed by machining). In these methods an ingot is cogged into bloom, which is followed by saw cutting, rough sizing, rough machining, heat treatment, semi finish machining and finish machining of the component.

The existing fluid end component geometry as shown in FIGS. 1, 2, 3 and 4 consists of all surfaces in fully machined condition which demands more input stock for manufacturing process and lot of material wastage during machining process. This also needs higher capacity equipment's for material handling.

The existing manufacturing process as shown in FIG. 9 is combination of "Open die forging, machining and heat treatment". In this process, the billet in rectangular blank formation from the ingot is achieved through open die forging and while remaining shape is achieved through machining. The existing process results into about 34% utilization of material thereby leading to about 66% wastage of material from cogged bloom to finished part. It is to be noted that the said cogged blooms are formed through open die forging and which are in rough shape and sized to rectangular blank for machining.

During mass production of such components, substantial raw material is wasted with conventional manufacturing method which results into large machining time and poor yield.

Another important limitation of the existing design and existing manufacturing method of Fluid End is that the machining route cuts through the continuous grain flow lines hence grain flow lines are not continuous along the contours of Fluid End. This is the reason why the Fluid End of existing design, manufactured by existing method lack in continuous grain flow lines along the contours of the fluid end.

There is therefore a need to provide an innovative design and an innovative manufacturing method for Fluid End. It is also important to reduce machining on the non-assembly areas from the product and produce the near net shape input to finish machining by forging. This will establish right balance between forging and machining process which effectively utilizes the material and reduces machining time. This leads into improved productivity of such parts without compromising on the desired mechanical properties and specific strength.

OBJECTS OF THE INVENTION

An object of the present invention is to provide safety and application critical components with as forged surfaces in the non-assembly areas.

A further object of the present invention is to provide safety and application critical components with effective material utilisation.

Still further object of the invention is to provide method of manufacturing the same.

Another object of the invention is to provide an optimized "cogged bloom" the size of which is input to the closed die forging.

Another object of the invention is to provide near-net shape forging so as to enhance utilisation of material from the forging with closed die route.

Another object of the invention is to provide forging die design for the said near-net-shape forging process.

Another object of the invention is to provide method of manufacturing near-net-shape preform from cogged bloom using closed die forging.

Yet another object of the invention is to provide machining design and tool path generation program for said near-net-shape forging.

Yet another object of the invention is to provide the Fluid End with continuous grain flow lines along the contour and improved mechanical and metallurgical properties through closed die forging followed by heat treatment.

BRIEF DESCRIPTION OF DRAWINGS

FIGS. 5 and 6 show perspective views fluid ends manufactured using the process of invention

Figure 1:
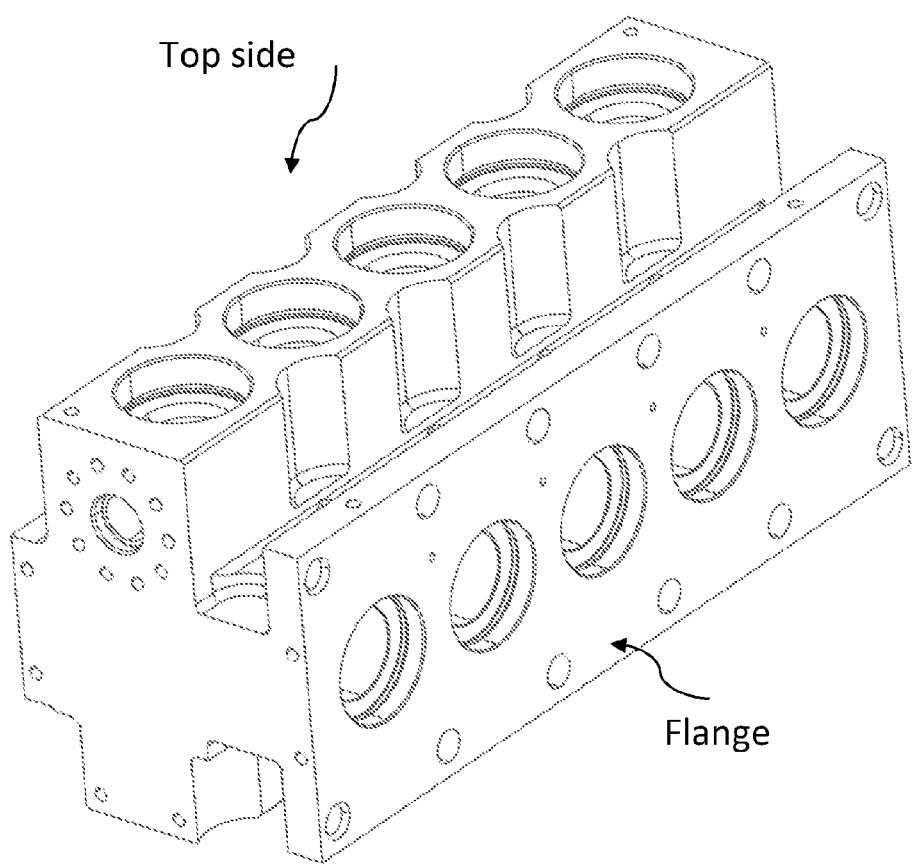
FIGS. 1 and 2 show perspective views of a fluid end manufactured using conventional process.

List of parts:

1. Fluid end
2. Main block
3. Flange
4. Neck
5. Assembly areas or surfaces
6. Non-assembly areas or surfaces
7. First surface
8. Second surface
9. Internal pathway
10. Protruded area
11. Die horn
12. Top die
13. Bottom die

SUMMARY OF THE INVENTION

The present invention describes the innovated design of Fluid End and its innovated manufacturing method.

In the present invention, fluid end (1) component geometry is optimized in such a way that, assembly areas or surfaces (5) are kept in machined condition whereas other or non-assembly areas (6) or surfaces are kept in as-forged condition, as shown in FIGS. 5, 6, 7 and 8. With this inventive design, the input weight is reduced. Also this innovated design of Fluid End resulted into significant reduction in machining time and chip removal.

The present invention also discloses a process of manufacturing safety and application critical components using a combination of open die and closed die forging, and machining. The process involves the steps of cogging of the ingot to form billet for closed die forging using open die forging, forging the billet in closed die using forging equipment, semi-finish/rough/partial machining, heat treatment, drilling and finish machining the component. Most of the non-assembly areas (i.e. the surfaces where no mating part is being assembled) of the fluid end are left in as-forged condition (i.e. machining operation at such areas is eliminated).

With the process of the present invention, 70 to 75% of the shape and size of the final component is achieved through forging and remaining 25 to 30% through machining.

Figure 11:
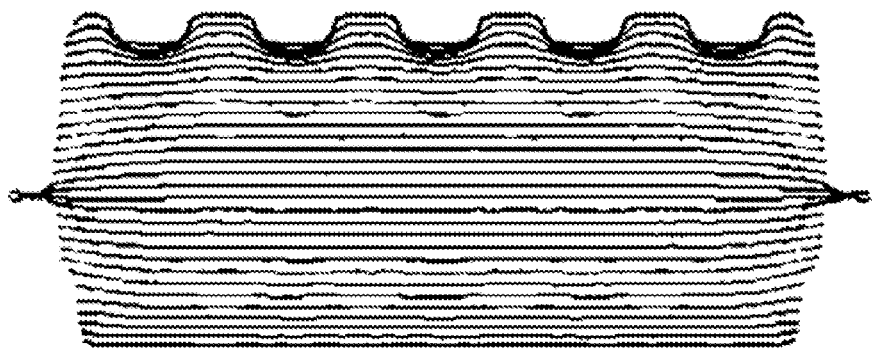
FIG. 11 shows the grain flow lines for the contour of the fluid end of the invention

The Fluid End (1) with continuous grain flow lines along the contours, (see FIG. 11) and improved mechanical and metallurgical properties is obtained by this innovative design and innovative manufacturing method.

DETAILED DESCRIPTION OF INVENTION

The present invention is applicable to any forged components that are used in variety of industries, particularly those which are formed from large ingots. The invention is particularly useful for safety and application critical components such as fluid end (1) which is used in oil and gas industry. The description that follows is based on a typical such fluid end.

Figure 2:
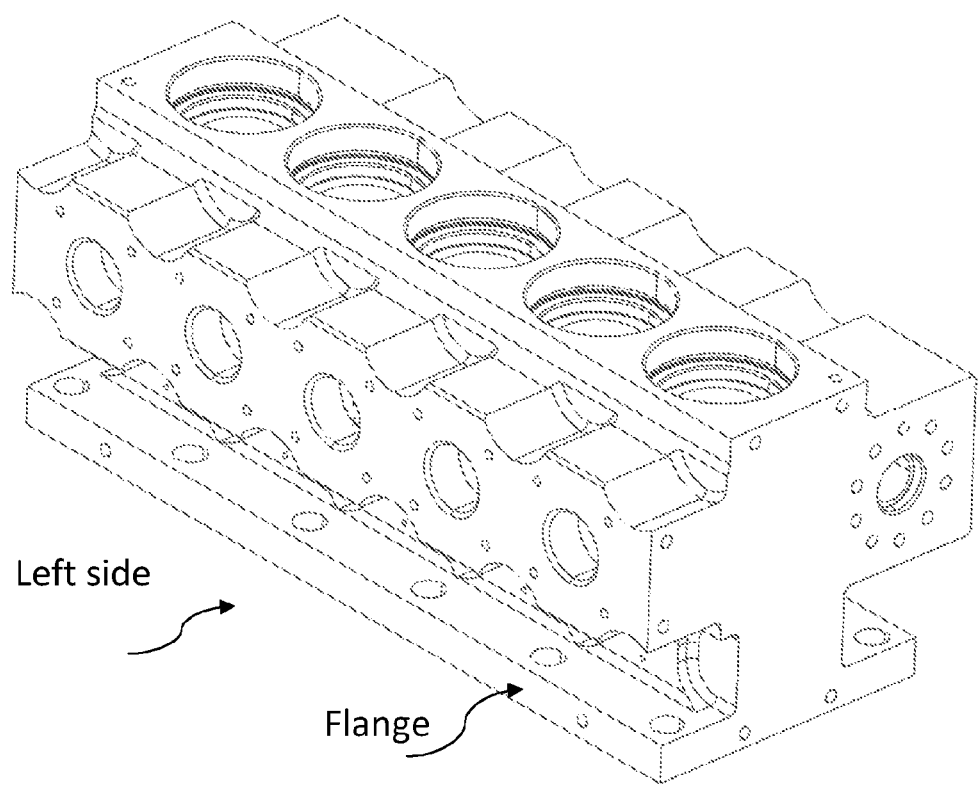
Figure 3:
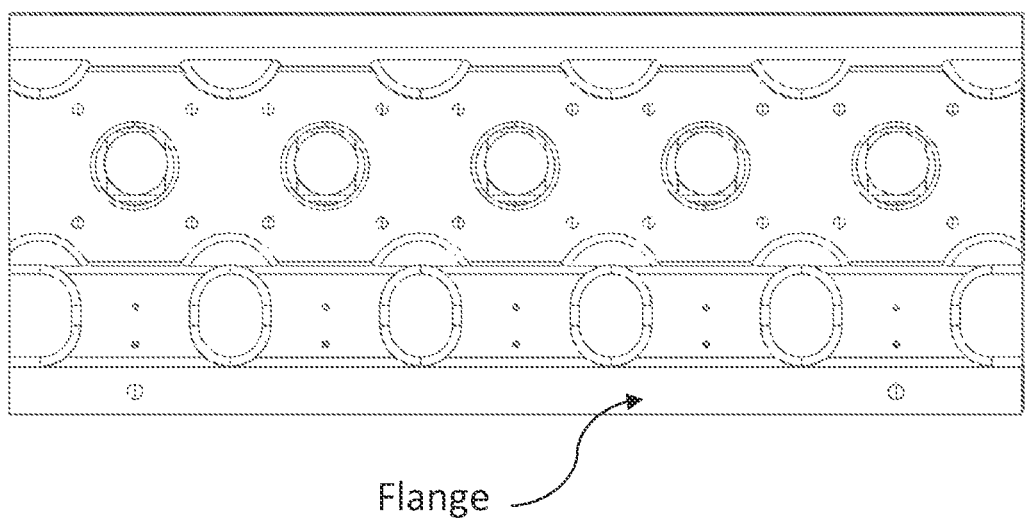
FIGS. 3 and 4 show side views of fluid ends manufactured using conventional process
Figure 4:
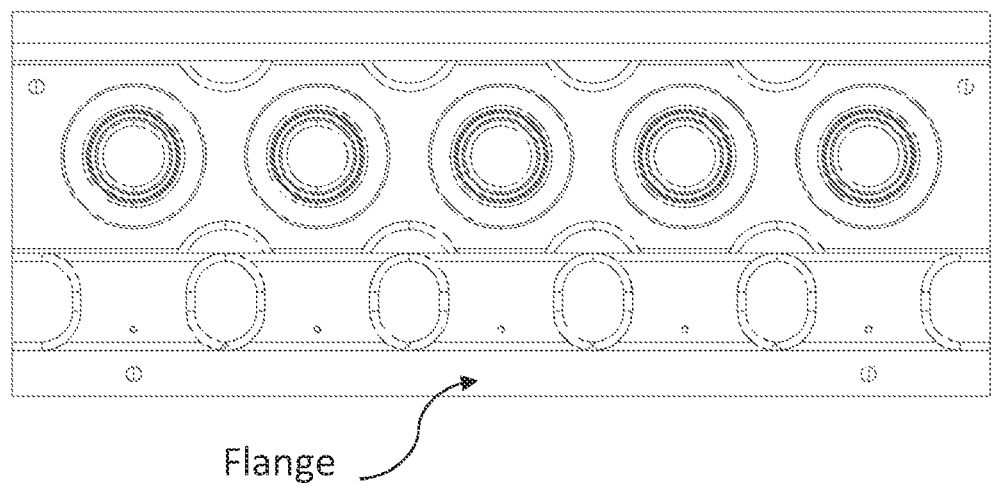

FIGS. 1 and 2 shows the perspective views of existing design of Fluid End. FIGS. 3 and 4 show some of the side views of the products shown in FIGS. 1 and 2. It is evident from FIGS. 1, 2, 3 and 4 that all the assembly faces and non-assembly faces of conventional Fluid End are machined. Most of the outer surfaces of the Fluid End's existing design are non-assembly surfaces. Hence there is wastage of material and machining time on non-assembly surfaces.

Figure 5:
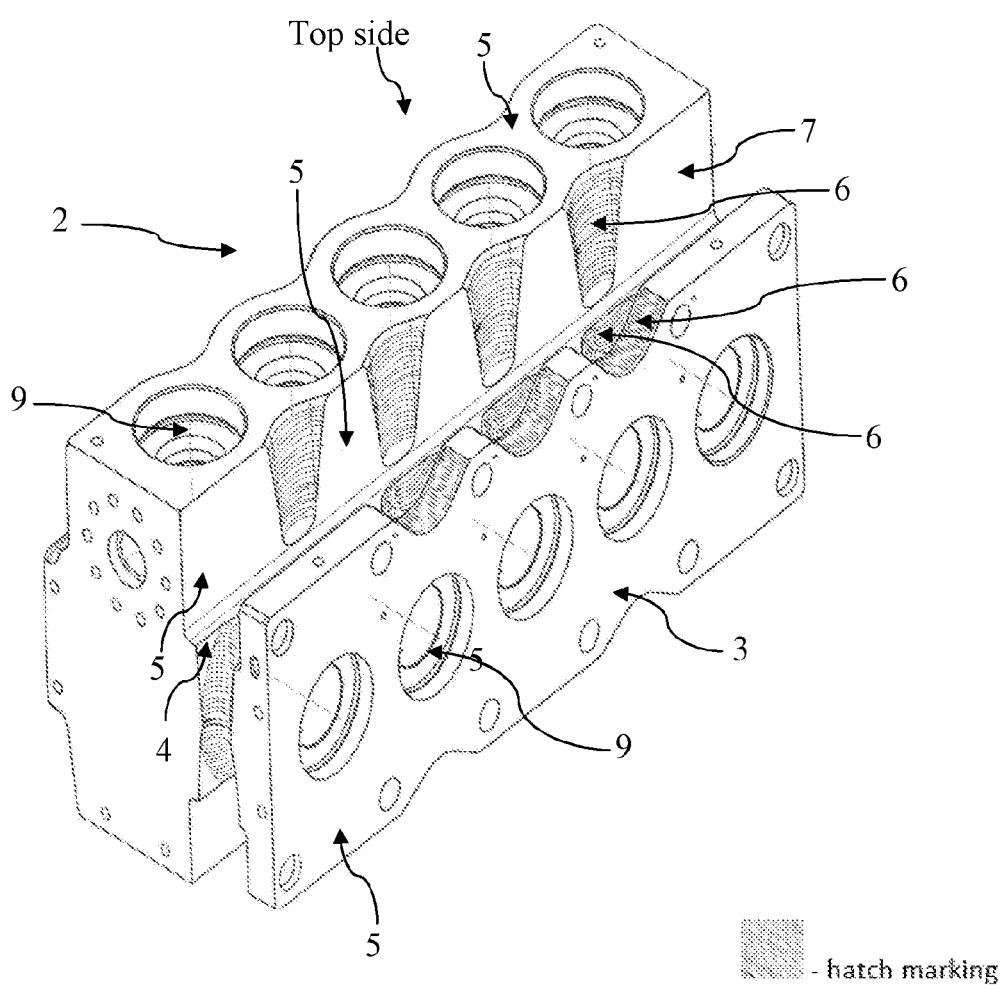
Figure 7:
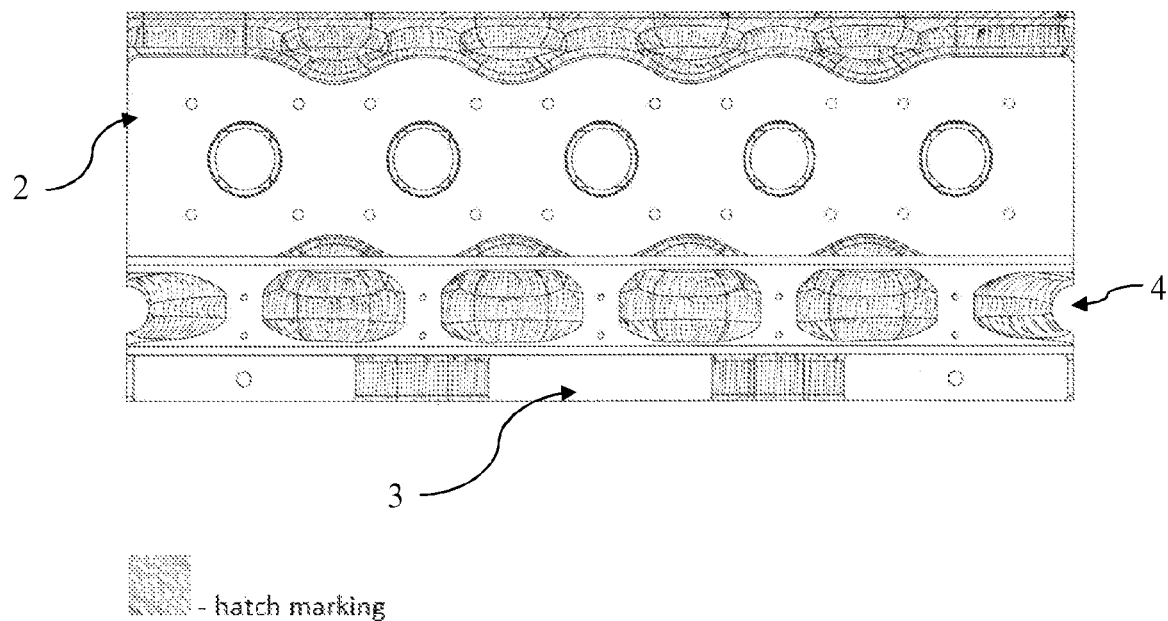
FIGS. 7 and 8 show side views of the fluid ends manufactured using the process of invention
Figure 8:
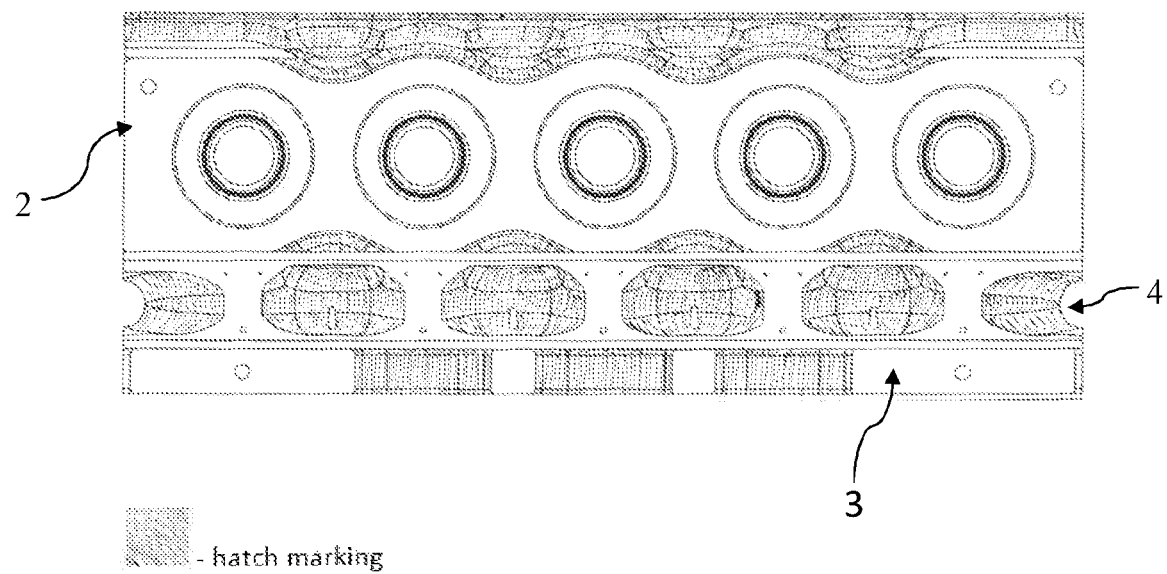

FIGS. 5 and 6 show perspective views of innovative design of the fluid end (1) and FIGS. 7 and 8 show some of the side views of the products shown in FIGS. 5 and 6, respectively.

As seen from FIG. 5, the fluid end (1) of the invention has a main block (2) and a flange (3). The area between the flange (3) and the main block (2) is a neck (4). The face of the main body facing the flange is termed first surface (7). The first surface (7) is interrupted by the neck (4). The face of the main block away from the flange is termed as the second surface (8). The second surface (8) is interrupted by a protruded area (10) that runs across the length of the fluid end (1). As seen from FIGS., 5, 6, 7, 8 The first surface (7) and the second surface (8) both comprise as-forged (6) and machined (5) areas or surfaces. The proportion of the as-forged areas or surfaces (6) as a percentage of the total surface area of the second surface (8) is substantial.

The fluid end (1) has a number of internal pathways (9) for fluid movement. In one embodiment of the invention, the pathways are formed as inter-connected holes provided within the body of the main block, the flange, and the neck.

The innovative design of fluid end (1) of the invention consists of machined (5) as well as as-forged surfaces (6). The assembly surfaces are machined while most of the non-assembly surfaces are formed as-forged. Here most of non-assembly surfaces are kept as-forged which means no machining is required on these surfaces. As shown in FIGS. 5 and 6, the first surface (7) has at least one non-assembly surface that is kept in as-forged condition. The non-assembly surfaces of the first surface (7) are provided between the fluid-carrying holes. The areas of the non-assembly surfaces, where machining is carried out are the areas where lifting holes may be provided.

Figure 9:
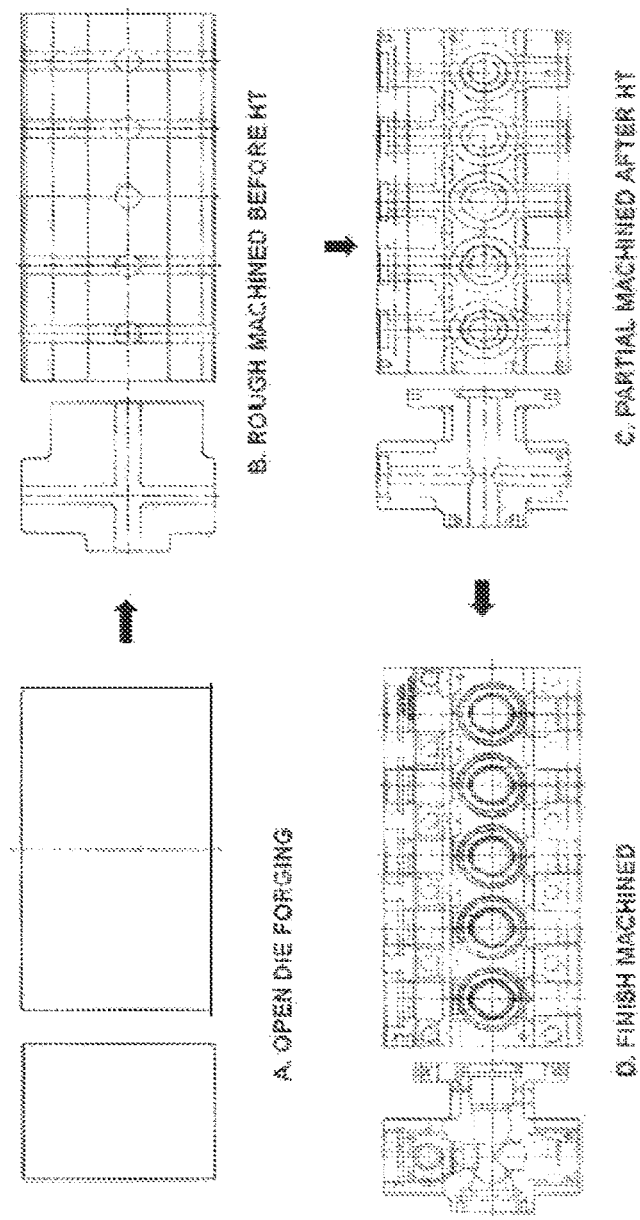
FIG. 9 shows a flow-chart of the conventional manufacturing process for a fluid end

The conventional manufacturing process as shown in FIG. 9, involves following steps, open die forging of ingot to rectangular blank,
rough machining,
heat treatment,
partial machining,
finish machining The conventional manufacturing process leads to a lot of wastage of material and energy.

Figure 10:
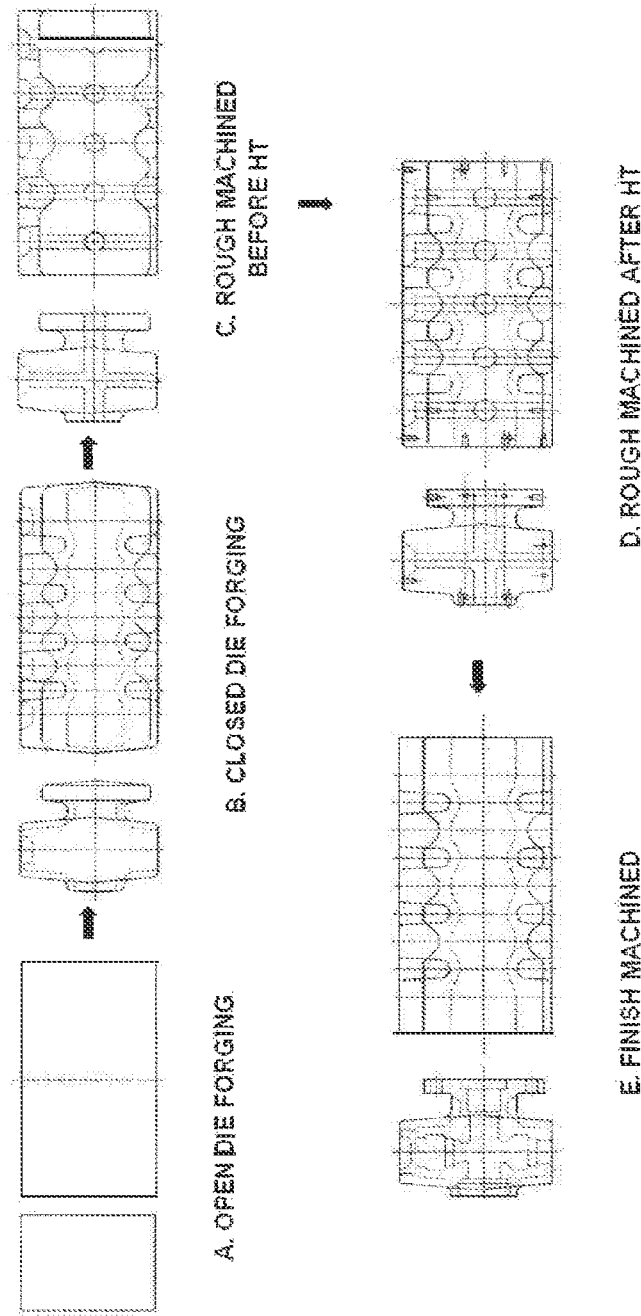
FIG. 10 shows a flow-chart of the method of manufacturing for a fluid end according to the invention

On the other hand, the process of the present invention as shown in FIG. 10, involves the following stages:

a. forging of an ingot into a billet using open die method;
b. forging in a closed die the said billet by providing blows in multiple steps to achieve near net shaped fluid end;
c. rough machining outer surfaces of assembly areas of the said near net shaped fluid end and keeping non-assembly surfaces as forged to achieve rough machined near net shaped fluid end;
d. providing heat treatment to said rough machined near net shaped fluid end to achieve the heat treated, rough machined, near net shaped fluid end;
e. providing further semi-finish or partial or rough machining to the said heat treated rough machined near net shaped fluid end, while leaving most of the non-assembly areas in as-forged condition;
f. drilling for creating internal pathways, once again, leaving most of the non-assembly areas in as-forged condition;
g. providing finish machining to produce fluid end.

It can thus be understood that the areas that are formed by forging technique and left as as-forged during the partial/rough/finish machining stages are left as as-forged in the final product.

As shown in FIG. 10, in the open die forging the cogging of the ingot produces a billet for the closed die forging. In the closed die forging, the billet is placed in between top and bottom dies and blows are given by hammer. This closed die forging is carried out in multiple steps. In the first step the billet is heated to forging temperature and a first set of blows are given depending on the part geometry and die closure dimension. A first-heated finisher results as a result of the first set of blows. After providing the required number of blows, if required, the product is further heated and then placed in the closed dies for the second set of blows. This helps to produce a second-heated finisher which is the near-net shaped component which is then subjected to machining. In the instance where the first set of blows is sufficient, the first-heated finisher results in the near-net shaped fluid end.

The neck (4) portion between the flange (3) and the main block (2) of the fluid-end (1) is difficult to forge integrally with the rest of the fluid end (1). This portion can be seen clearly in FIGS. 7 and 8 (and also partly in FIGS. 5 and 6). The process of the invention includes a step of designing the forging dies in such a way that the material will flows in the flange area to provide continuous grain flow lines (see FIG. 11).

With an iterative simulation approach, numerous manufacturing concepts for forging and machining were evaluated to optimize part geometry of near net shape, forging die design and manufacturing process using virtual manufacturing techniques. Forging part geometry i.e. near net shape and process was optimized using 3D metal flow simulation and machining process was optimized using CAM simulation. Based on simulation results, an optimal manufacturing methodology was developed for manufacturing components such as the fluid ends used in the oil and gas industry.

Figure 12:
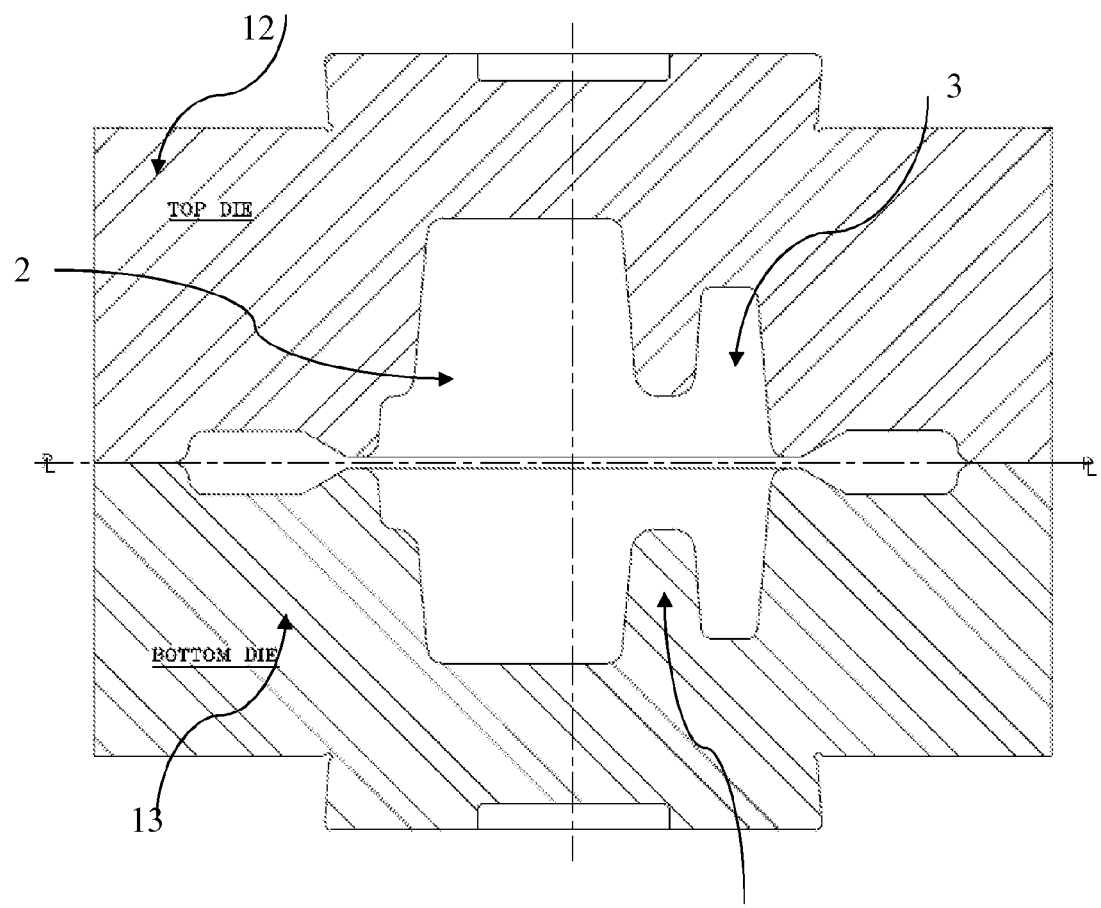
FIG. 12 shows the die set up used in the manufacture of the fluid end according to the invention (Please note that the as-forged areas of the invention are indicated by hatch markings.)

FIG. 12 shows the top and bottom dies (12 and 13) used in closed die forging of fluid end, separated by parting line (PL). The figure also shows the die horns (11), which are an integral part of both the dies. Provision of adequately designed die horns helps to create flange (3) of the main body with deeper cavities on both sides of fluid end for the formation of neck (4). However, this leads to frequent yielding/deformation/deflection of the die horns. Also the flange is difficult to fill up in the conventional methods, since ratio of cavity depth to width is high. The die horn design of the method of invention (optimisation and simulation as explained above) is such that it overcomes these drawbacks.

The Fluid End with continuous grain flow lines along the contours was achieved by adding closed die forging stage in between open die forging and machining process.

The near net shaped component (the fluid end) is next partial machined to remove the draft on forged fluid end (1). This step is then followed by heat treatment to achieve the required metallurgical and mechanical properties. After this, holes are drilled for creating internal pathways as per the component specification followed by finish machining to achieve the final shape and size.

Operational Benefits:

A number of operational benefits have been observed as a result of the present invention. These have been summarised here:
1. Reduction in input weight for forging.
2. Significant reduction in machining time
3. Productivity improved.

It is evident from the foregoing discussion that the present invention has a number of embodiments.

1. A fluid end comprising a main block, a flange, said main block and flange connected by a neck wherein said fluid end has a first and a second surface, said first surface being the surface of said main block nearer the flange and said second surface being the surface of said main block away from said flange, and wherein said fluid end has a number of assembly and non-assembly surfaces, characterised in that assembly surfaces are machined condition and at least some of non-assembly surfaces are in as-forged condition, as indicated in FIGS. 5, 6, 7, and 8.

2. A method of manufacturing a fluid end characterised in that said process comprises the steps of:
   a. forging of an ingot into a billet using open die method;
   b. forging said billet by providing blows in multiple steps to achieve near net shaped fluid end;
   c. rough machining outer surfaces of assembly areas of said near net shaped fluid end and keeping non-assembly surfaces as forged to achieve rough machined near net shaped fluid end;
   d. providing heat treatment to said rough machined near net shaped fluid end to achieve the heat treated rough machined near net shaped fluid end;
   e. providing further semi-finish or partial or rough machining to the said heat treated rough machined near net shaped fluid end;
   f. drilling for creating internal pathways;
   g. providing finish machining to produce fluid end.

3. A method as disclosed in embodiment 2 characterised in that said multiple steps of providing blows further comprise the steps of:
   a. heating said billet to forging temperature and providing a first set of blows to produce a first-heated finisher;
   b. if required, heating the first-heated finisher further and providing a second set of blows by placing said first-heated finisher in a closed die to produce a second-heated finisher;
   wherein either said first-heated finisher, or in the case said step b is executed, said second-heated finisher produces a near-net shape fluid end, ready to be machined.

4. A method as disclosed in embodiments 2 or 3, characterised in that said closed die is constructed so that the material in the flange area of the forged product flows so as to provide continuous grain flow lines along the contours of fluid end.

While the above description contains much specificity, these should not be construed as limitation in the scope of the invention, but rather as an exemplification of the preferred embodiments thereof. It must be realized that modifications and variations are possible based on the disclosure given above without departing from the spirit and scope of the invention. Accordingly, the scope of the invention should be determined not by the embodiments illustrated, but by the appended claims and their legal equivalents.

The invention claimed is:

1. A method of manufacturing a fluid end comprising a main block and a flange, the main block having a first and a second surface, the first surface being the surface of the main block nearer the flange and the second surface being the surface of the main block away from the flange, wherein the fluid end has assembly and non-assembly surfaces, wherein a first direction is defined extending between the block and the flange, and a second direction is defined extending perpendicularly to the first direction, the method comprising the steps of:
   a. forging of an ingot into a billet using open die method;
   b. forging the billet in a closed die by providing blows in multiple steps to form the flange and the main block with the first surface and the second surface and produce a near net shaped fluid end in as-forged condition, wherein a neck is formed between the flange and the main block in the first direction, and wherein the flange extends outwardly from the neck in the second direction;

c. rough machining a portion of at least one of the first surface and the second surface of the main block of the near net shaped fluid end to form rough machined surfaces while leaving another portion of the same of the at least one of the first surface and the second surface having the portion that was rough machined in as-forged condition to produce a rough machined near net shaped fluid end;

d. providing heat treatment to the rough machined near net shaped fluid end to produce a heat treated rough machined near net shaped fluid end;

e. providing further semi-finish or partial or rough machining to the rough machined surfaces of the heat treated rough machined near net shaped fluid end to produce further machined surfaces while leaving the another portion of the at least one of the first surface and the second surface in as-forged condition;

f. drilling the fluid end to create internal pathways therethrough; and g. providing finish machining to the further machined surfaces to produce the assembly surfaces of the fluid end, wherein the another portion constitute the non-assembly surfaces.

2. The method as claimed in claim 1, wherein the multiple steps of providing blows further comprise the steps of:

a. heating the billet to forging temperature and providing a first set of blows among the blows to produce a first-heated finisher in the closed die;

b. if required, heating the first-heated finisher further and providing a second set of blows among the blows by placing the first-heated finisher in the closed die to produce a second-heated finisher;

wherein either the first-heated finisher, or in the case step b is executed, the second-heated finisher produces the near-net shape fluid end, ready to be machined.

3. The method as claimed in claim 2, wherein the closed die comprises die horns and is constructed to cause the near net shaped fluid end to have continuous grain flow lines along contours thereof.

4. The method as claimed in claim 1, wherein the portion having the rough machining is on both the first surface and the second surface of the main block, and wherein the another portion in as-forged condition is left on both the first surface and the second surface of the main block.

5. The method as claimed in claim 4, wherein a third portion having rough machining is also on the flange, and wherein a fourth portion in as-forged condition is also left on the flange.

6. The method as claimed in claim 5, wherein a fifth portion having the rough machining is also on a neck between the flange and the main block, and wherein a sixth portion in as-forged condition is also left on the neck.

* * * * *